United States Patent
Dina et al.

(10) Patent No.: US 11,558,948 B2
(45) Date of Patent: Jan. 17, 2023

(54) SMART ATTACHMENT FOR ANSI CONNECTOR

(71) Applicant: OPEN PLATFORM SYSTEMS LLC, Garden City, ID (US)

(72) Inventors: Dan Dina, Garden City, ID (US); Robert Deely, Garden City, ID (US); George Walter Lewis, Garden City, ID (US)

( * ) Notice: Subject to any disclaimer, the term of this patent is extended or adjusted under 35 U.S.C. 154(b) by 0 days.

(21) Appl. No.: 17/189,189

(22) Filed: Mar. 1, 2021

(65) Prior Publication Data

US 2021/0274625 A1    Sep. 2, 2021

Related U.S. Application Data

(60) Provisional application No. 62/983,256, filed on Feb. 28, 2020.

(51) Int. Cl.
| | | |
|---|---|---|
| H05B 47/105 | (2020.01) | |
| H05B 47/19 | (2020.01) | |
| H05B 45/12 | (2020.01) | |
| H05B 47/11 | (2020.01) | |

(52) U.S. Cl.
CPC ............ H05B 47/19 (2020.01); H05B 45/12 (2020.01); *H05B 47/11* (2020.01)

(58) Field of Classification Search
None
See application file for complete search history.

(56) References Cited

U.S. PATENT DOCUMENTS

2020/0363043 A1*  11/2020  Stegeman ............ H05B 47/105

* cited by examiner

*Primary Examiner* — Dedei K Hammond
(74) *Attorney, Agent, or Firm* — Scott D. Swanson; Shaver and Swanson, LLP

(57) ABSTRACT

A Smart ANSI Microcontroller is provided to retrofit preexisting light fixtures. The preexisting light fixtures are configured with 5 pin or 7 pin ANSI receptacles. The Smart ANSI Microcontroller is configured to accept a variety of control signals and to control the power output of the driver of the preexisting driver of the luminaire in order to control the light output of the luminaire. The Smart ANSI Microcontroller is configured with a 5 pin or 7 pin ANSI male connector that is configured for mating engagement with the 5 pin or 7 pin female ANSI connector found in typical prior art luminaires, such as street lamps. The Smart ANSI Microcontroller allows for contemporary accessory light controllers to be utilized with the preexisting luminaires. The contemporary light controllers can be configured to connect to the Smart ANSI Microcontroller via wireless and/or wired connection.

6 Claims, 3 Drawing Sheets

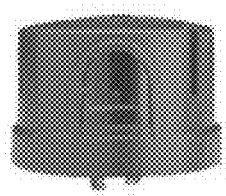
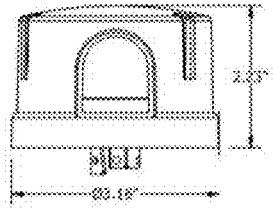
Fig. 1 DTL Photocell
Typical ANSI Signals
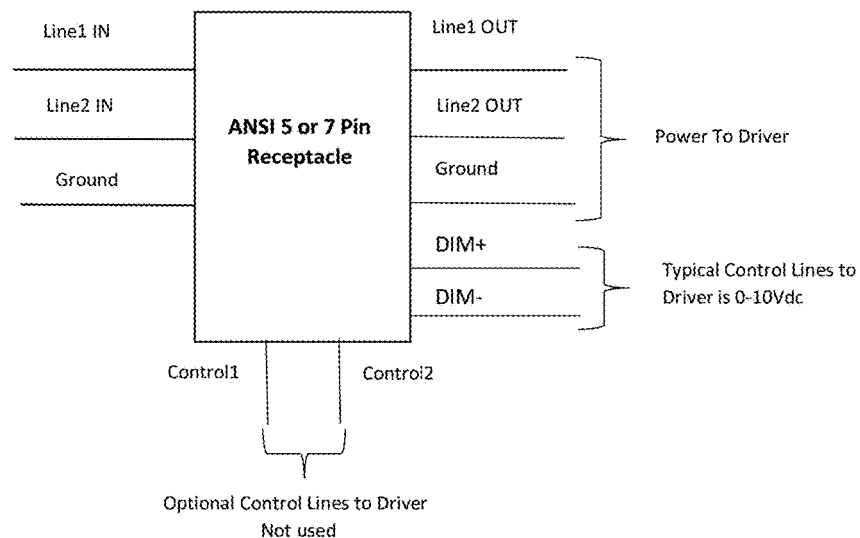
FIG. 2

Smart Microcontroller Signals

Smart ANSI Microcontroller Wireless Connections

SMART ATTACHMENT FOR ANSI CONNECTOR

PRIORITY/CROSS-REFERENCE TO RELATED APPLICATIONS

This application claims the benefit of U.S. Provisional Application No. 62/983,256, filed Feb. 28, 2020 the disclosure of which is incorporated by reference.

TECHNICAL FIELD

The disclosure generally relates to the field of power control for lighting applications. Particular embodiments relate to a Smart ANSI Microcontroller for controlling power input and light output in one or more lighting devices and/or lighting systems.

BACKGROUND

The typical outdoor street light fixture contains an ANSI Standard (C136.41) receptacle with the elements shown below, AC input voltage, AC output voltage and several control lines used for dimming and control of the light fixture. The current state of the art for years is to install a photocontrol device with a mating ANSI connector into the receptacle and control the power through a relay to the light driver turning the fixture on at dusk and off at dawn (e.g. Acuity DTL Photocontrol shown in FIG. 1). Also, dimming parameters can be set to dim to certain pre-programmed profiles. However, the Applicant is not aware of a way to attach an alternate control beyond the current state of the art controller. What is needed is a Smart ANSI Microcontroller capable of accepting varying standard control types through one or more common control lines, including a wired control line or a wireless control line, and configured at installation, in the factory or the field to connect to standard 5-pin or 7-pin ANSI connectors, and preferably being configured to detect the standard utilized by an accessory light controller upon connection of the accessory light controller to the common control line, and preferably such that the Smart ANSI Microcontroller is configured to prompt an installer to approve of the recognition of the accessory light controller or to automatically switch control of the output of the driver in response to new or different control standards and/or power input source(s).

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a Smart ANSI Microcontroller capable of switching between a common set of control lines and configured at installation in the factory or the field. This novel idea will allow a huge installed base of light fixtures utilizing an ANSI 5 or 7 pin receptacle to be upgraded to state of the art technology and preferably wireless control. The disclosed Smart ANSI Microcontroller is configured to control a driver of a luminaire that provides DC power to a LED of the luminaire based on an accessory light controller and/or wireless control signals. The Smart ANSI Microcontroller is configured to recognize and switch between control and dimming standards, including 0-10V, pulse width modulation, digital device interface and DALI/DALI2/D4i industry standards. Preferably the Smart ANSI Microcontroller is configured to detect the control standard of an accessory light controller that is connected to the control input and to automatically control the driver DC power output according to the control standard of the accessory light controller detected. Preferably this occurs upon initial connection of the accessory light controller to the control line of the Smart ANSI Microcontroller.

This novel design allows multiple interfaces to use the same physical connections on the microcontroller in order to support several Digital and Analog control methods which by definition are usually mutually exclusive to each other. For example, the Analog Dimming function requires an accessory light controller to present an Analog Voltage level between the IN+/IN− terminals of the driver (power supply), which when sampled by the driver interface circuitry provides an indication of the Diming level needed to control the Voltage/Current delivery to the load (LED). In this mode the full range of Light output is comprised of a voltage level in the range of 0-10V which using visual logarithmic levels determine how much light output to generate out of the light fixture being powered by the Power Supply. The same driver IN+/IN− pins or wireless light control can be programmed through the wireless interface in the controller design, to configure them to act as the digital interface (DIM+/DIM−) typically used by the industry standard Light Control interfaces such as DALI, DALI2, D4i and others. Similarly the Smart ANSI Microcontroller can be configured to recognize the accessory light controller connected to the IN+/IN− pins and adjust and control the power supply to the light in accordance with the control type from the recognized controller.

By allowing commissioning and changing, preferably automatically, the control interface at time of installation, the controller design greatly reduces the clutter and expense of having to provide additional interface terminals for each Analog and Digital interface supported.

The Smart ANSI Microcontroller design optionally includes wireless connectivity capabilities to allow control interface programmability at the time of construction in the factory or at a customer site. This novel idea allows multiple interfaces to use the same physical connections on the controller in order to support several Digital and Analog control methods which by definition are nonexistent in traditional ANSI connections. The device can be configured to use, for example, Thread, Bluetooth Mesh, Zigbee, WIFI, cellular or other wireless networking communication technology.

For example, the Analog Dimming function requires a control device to present an Analog Voltage level between the DIM+/DIM− terminals to the Driver (Power Supply), which when sampled by the Driver interface circuitry provides an indication of the Dimming level needed to control the Voltage/Current delivery to the load. In this mode the full range of Light output is comprised of a voltage level in the range of 0-10V which using visual logarithmic levels determine how much light output to generate out of the light fixture being powered by a Driver.

The same DIM+/DIM− pins can be programmed through the wireless interface in the Smart ANSI Microcontroller design, to configure them to act as the digital interface typically used by the industry standard Light Control interfaces such as DALI, DALI2, D4i and others. The optional two control lines can also be used for additional interface standards allowing for multiple interface standards to be operational at the same time or for optional light fixture accessories communication.

The Smart ANSI Microcontroller may have a global position system (GPS) chip installed to allow location identification at installation and commission of the Smart ANSI Microcontroller. The Smart ANSI Microcontroller will also preferably incorporate safety protections circuitry that will allow detection of the Control lines to alert the Owner of the installation (through wireless mesh networking means described elsewhere in a separate patent disclosure) that faults have occurred and approve or disable the fixture until human intervention inspects the fault. Over voltage protection against power line transients is also preferably standard in the Smart ANSI Microcontroller.

An additional feature of the programmability, monitoring and change of functionality proposed by this Patent disclosure is that the Smart ANSI Microcontroller will be made virtually immune from installation error by assuring that the proper control communication method is selected based on the driver installed in the fixture.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

BRIEF DESCRIPTION OF THE DRAWINGS

FIG. 1 illustrates a prior art DTL Photocell.

FIG. 2 illustrates a standard prior art wiring diagram embodiment of an ANSI pin male connection and receptacle connection.

DETAILED DESCRIPTION OF THE PREFERRED EMBODIMENTS

Figure 3:
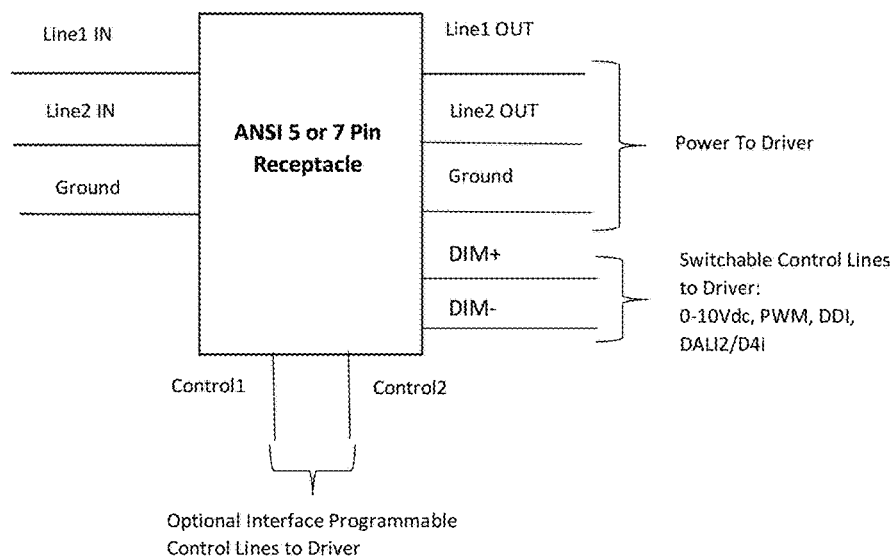
FIG. 3 illustrates a preferred embodiment of a wiring diagram for a Smart ANSI Microcontroller for attaching to a light driver via an ANSI 5 or 7 pin connection.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a standard photocontrol device for an ANSI light driver. The device is typically attached to a female receptacle in a light control driver. A high percentage of currently installed lights utilize this type of connection and typically utilize the depicted photocontroller to control power to the luminaire. Typically the depicted controller turns the light on in response to detected low levels of ambient light or off in response to detection of a preprogrammed sufficient level of light. Generally in installation the photocontrol device attaches to the driver by a rotational or twist lock mechanism.

FIG. 2 illustrates a typical prior art embodiment of a five or seven pin ANSI connector. The male connection of the photocontroller is inserted into the female connection of the driver. The optional control lines are not used. DIM+ and DIM− are configured to control driver dimming by use of 0-10Vdc power.

FIG. 3 illustrates a preferred embodiment of a Smart ANSI Microcontroller configured for attachment via the five or seven pin ANSI female receptacle of a prior art light. The depicted microcontroller utilizes power in and power out to the driver. Dimmer pins DIM+ and DIM− provide several control standards to the driver. Optional control lines Control1 and Control2 are provided in the depicted embodiment for other control standards or signals to or from other light fixture installed accessories. Optionally an input (not shown) from the accessory control device and/or a wireless connection (shown in FIG. 4) provide input for a modern light controller.

Figure 4:
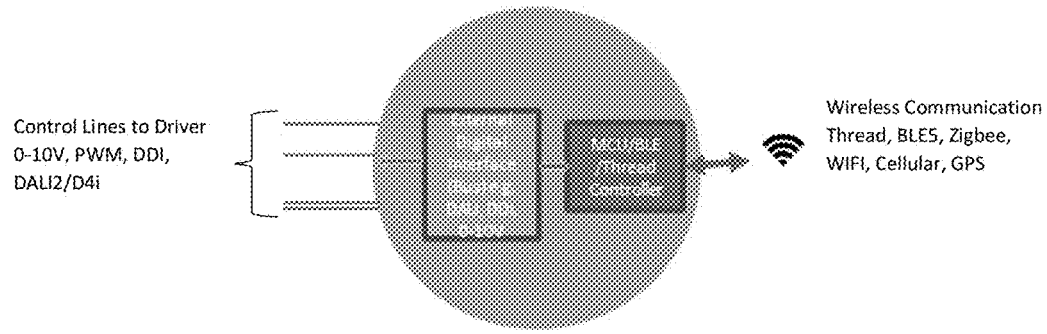
FIG. 4 illustrates a Smart ANSI Microcontroller configured with a wireless connection.

FIG. 4 illustrates a preferred embodiment of a Smart ANSI Microcontroller configured with wireless communication to communicate to a local device, local network, internet, and/or other network. The Smart ANSI Microcontroller in the depicted embodiment allows for wireless control and/or wired control of the luminaire by an accessory controller and/or via programming provided through external devices. The provided Smart ANSI Microcontroller allows for the use of digital controllers to control the light output of the luminaire by use of various wireless signals.

Figure 5:
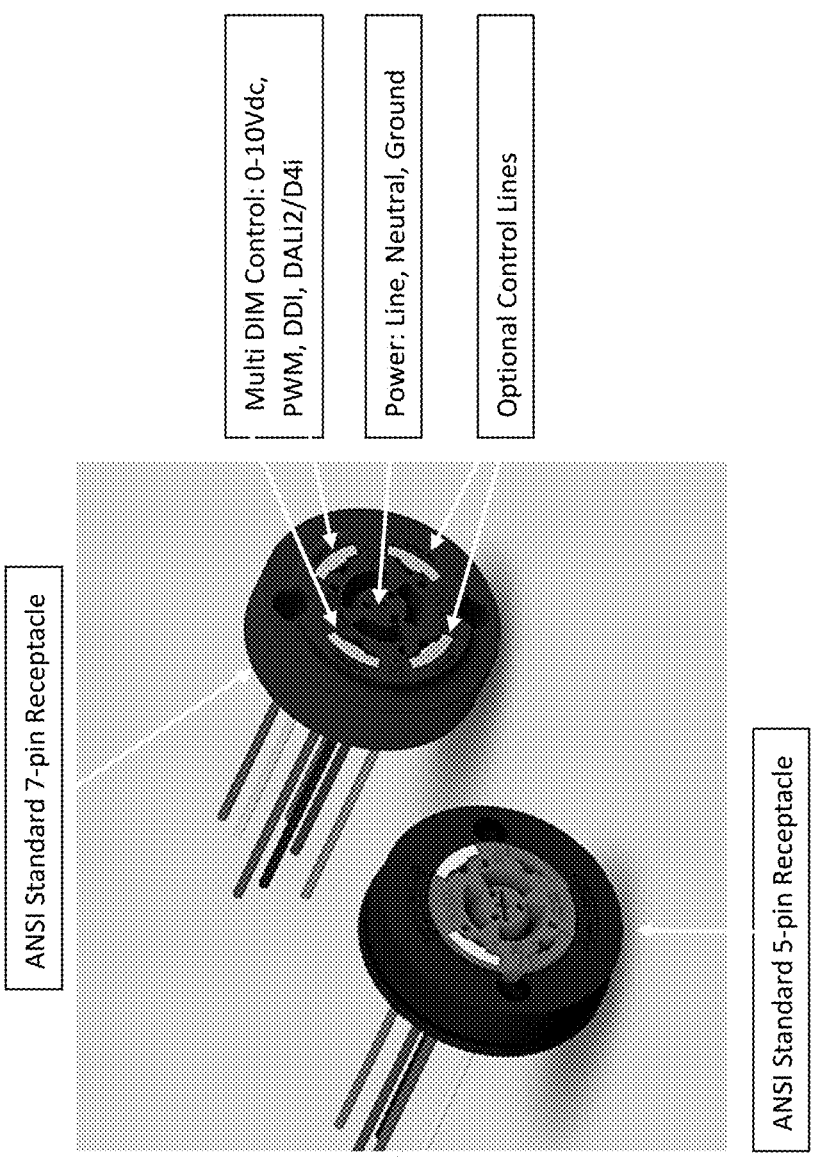
FIG. 5 illustrates a preferred embodiment of the ANSI 5 and 7 pin receptacle pin assignments for use with a Smart ANSI Microcontroller.

FIG. 5 illustrates a preferred embodiment of a Smart ANSI Microcontroller configured for attachment via the five or seven pin ANSI female receptacle of a prior art light. The depicted 7-pin receptacle utilizes AC power in and power out to the driver. Dimmer pins DIM+ and DIM− provide several control standards to the driver. Optional control lines Control1 and Control2 are provided in the depicted embodiment for other control standards or signals to or from other light fixture installed accessories.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

We claim:

1. An intelligent SMART ANSI Microcontroller configured for the control of a luminaire, the luminaire having a driver having dimming capability, an AC power input and output, and a five pin or seven pin connection for a light controller, said five pin or seven pin connection comprising Dim+ and Dim−analog control pin receptacles, said microcontroller comprising:
   a five pin or seven pin male connection configured to connect to the five pin or seven pin female receptacle for a light controller of the driver, wherein said five pin or seven pin connection comprising a Dim+ and Dim− control pin configure for mating engagement with said Dim+ and Dim−receptacles of said driver;

a control input configured for connection to an accessory light controller;

a Smart ANSI Microcontroller configured to detect an accessory light control standard from said accessory light controller and to provide a control signal according to the light control standard recognized by the driver of the luminaire to control a DC power output of said light driver such that said accessory light controller controls the light output of the luminaire.

2. The intelligent driver of claim 1, wherein said Smart ANSI Microcontroller is configured to detect the control standard of the accessory light controller connected to said control input and to automatically control the DC power output of said driver according to the control standard of the accessory light controller detected.

3. The intelligent driver of claim 1, wherein said Smart ANSI Microcontroller comprises a safety control circuit configured to detect wiring that is not compatible with the control standard that is programmed into said Smart ANSI Microcontroller.

4. The intelligent driver of claim 1, wherein said Smart ANSI Microcontroller detects control standards selected from the group consisting of 0-10V, pulse width modulation, digital device interface and DALI/DALI2/D4i industry standards.

5. The Smart ANSI Microcontroller of claim 1 further comprising a wireless or wired communication device to connect said Smart ANSI Microcontroller to at least one other Smart ANSI Microcontroller in a mesh network or to the Internet.

6. The Smart ANSI Microcontroller of claim 1 further comprising a global positioning system chip, wherein said SMART ANSI Microcontroller is configured to identify the location identification of said SMART ANSI Microcontroller at installation and commission of the Smart ANSI Microcontroller.

* * * * *